United States Patent
Shi et al.

(10) Patent No.: US 10,414,511 B2
(45) Date of Patent: Sep. 17, 2019

(54) AERIAL VEHICLE POWERING OFF METHOD AND DEVICE, AND AERIAL VEHICLE

(71) Applicant: SZ DJI TECHNOLOGY CO., LTD., Shenzhen (CN)

(72) Inventors: Renli Shi, Shenzhen (CN); Xuyang Pan, Shenzhen (CN); Jianyu Song, Shenzhen (CN); Canlong Lin, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 92 days.

(21) Appl. No.: 15/415,303

(22) Filed: Jan. 25, 2017

(65) Prior Publication Data

US 2017/0129618 A1 May 11, 2017

Related U.S. Application Data

(63) Continuation of application No. PCT/CN2014/083482, filed on Jul. 31, 2014.

(51) Int. Cl.
*B64D 31/00* (2006.01)
*G05D 1/06* (2006.01)

(52) U.S. Cl.
CPC ........ *B64D 31/00* (2013.01); *B64C 2201/042* (2013.01); *G05D 1/0676* (2013.01)

(58) Field of Classification Search
CPC .................................. B64D 31/00; B64D 31/06
See application file for complete search history.

(56) References Cited

U.S. PATENT DOCUMENTS

| 4,633,404 A | 12/1986 | Greeson et al. |
| 8,135,503 B2* | 3/2012 | Parras ................. G05D 1/0676 244/183 |
| 9,317,040 B1* | 4/2016 | Hilde ..................... G05D 1/042 |
| 9,448,562 B1* | 9/2016 | Sirang ................. G05D 1/0676 |
| 9,616,998 B2* | 4/2017 | Oakley ................. B64C 39/024 |
| 2002/0121575 A1 | 9/2002 | Greene |
| 2010/0152933 A1* | 6/2010 | Smoot ................. G01C 21/165 701/16 |
| 2013/0110324 A1 | 5/2013 | Moune |

FOREIGN PATENT DOCUMENTS

| CN | 101830286 A | 9/2010 |
| CN | 102092475 A | 6/2011 |
| CN | 102126560 A | 7/2011 |
| CN | 102156480 A | 8/2011 |
| CN | 103935508 A | 7/2014 |
| CN | 104049641 A | 9/2014 |

OTHER PUBLICATIONS

The World Intellectual Property Organization (WIPO) International Search Report for PCT/CN2014/083482, dated May 4, 2015, pp. 1-6.

* cited by examiner

*Primary Examiner* — Todd M Melton
(74) *Attorney, Agent, or Firm* — Anova Law Group, PLLC (57) ABSTRACT

A method and device for automatically powering off an aerial vehicle, and an aerial vehicle, are provided. The method comprises detecting an operating state of the aerial vehicle, and shutting down a propulsion output of the aerial vehicle if the operating state of the aerial vehicle is a landed state, to effect automatic powering off of the aerial vehicle after landing.

20 Claims, 6 Drawing Sheets

AERIAL VEHICLE POWERING OFF METHOD AND DEVICE, AND AERIAL VEHICLE

CROSS-REFERENCE TO RELATED APPLICATION

This is a continuation application of International Application No. PCT/CN2014/083482, filed on Jul. 31, 2014, the entire contents of which are incorporated herein by reference.

TECHNICAL FIELD

The present disclosure relates to the technical field of aerial vehicles, and in particularly, to a method and device for automatically powering off an aerial vehicle and an aerial vehicle.

BACKGROUND

Current aerial vehicles can comprise fixed-wing aerial vehicles and rotor-wing aerial vehicles. The rotor-wing vehicles can take off and land vertically. For a rotor-wing aerial vehicle, a rotation of a propeller can be driven by an electric motor, thereby generating various level of pulling force to effect a taking off, flight or landing of the aerial vehicle.

In taking off and landing a conventional aerial vehicle, an operation of enabling a propulsion output of the electric motor (i.e., a starting operation) and an operation of disabling a propulsion output of the electric motor (i.e., a stopping operation) are performed. Complicated operations are specified to power off the aerial vehicle, so as to prevent any erroneous operations. If the user decides a landing, the complicated operations are performed to power off the aerial vehicle. For instance, the aerial vehicle can be powered off by pulling two joysticks of the remote controller to a lowest level for more than 5 seconds.

For conventional aerial vehicles, the user has to determine a stage of landing and perform a power off operation. The operations are time-consuming and complicated.

SUMMARY

The present disclosure provides a method and device for automatically powering off an aerial vehicle. The present disclosure also provides an aerial vehicle. With the present disclosure, a powering off of an aerial vehicle can be implemented in an automatic and intelligent manner.

The present disclosure provides a method for automatically powering off an aerial vehicle. The method comprise: detecting an operating state of the aerial vehicle; and shutting down a propulsion output of the aerial vehicle if the operating state of the aerial vehicle is a landed state, to effect automatic powering off of the aerial vehicle after landing.

In some embodiments, detecting the operating state of the aerial vehicle can comprise: obtaining flight information of the aerial vehicle, and determining whether the flight information satisfies a preset landed criterion, wherein the flight information comprises any one or more pieces of relative altitude information, absolute altitude information and movement information; and determining the aerial vehicle is in the landed state, if the flight information satisfies a preset landed criterion.

In some embodiments, detecting the operating state of the aerial vehicle can comprise: obtaining relative altitude information of the aerial vehicle, wherein the relative altitude information comprises a landing distance to a landing plane; and determining the aerial vehicle is in the landed state if the obtained relative altitude information satisfies a preset landed criterion. In some instances, the relative altitude information satisfying a preset landed criterion can comprise: a number of landing distances, which are obtained within a time period threshold and smaller than a distance threshold, reaches a threshold. The time period threshold and the distance threshold can be specified in the preset landed criterion.

In some embodiments, detecting the operating state of the aerial vehicle can comprise: obtaining absolute altitude information of the aerial vehicle; calculating a variance of absolute altitudes from the obtained absolute altitude information; and determining that the preset landed criterion is satisfied and the aerial vehicle is in the landed state, if the variance is smaller than a variance threshold and the aerial vehicle is descending, wherein the variance threshold is specified in the preset landed criterion.

In some embodiments, detecting the operating state of the aerial vehicle can comprise: detecting an operating state of a distance measuring module which is provided in the aerial vehicle; instructing the distance measuring module to detect a landing distance of the aerial vehicle to a landing plane if the operating state of the distance measuring module is a normal state, and determining that a preset landed criterion is satisfied and the aerial vehicle is in the landed state if a number of landing distances, which are detected within a preset time period threshold and are smaller than a preset distance threshold, reaches a preset threshold; and obtaining absolute altitude information of the aerial vehicle, and calculating a variance of absolute altitudes from the obtained absolute altitude information if the operating state of the distance measuring module is an abnormal state, and determining that a preset landed criterion is satisfied and the aerial vehicle is in the landed state if the variance is smaller than a preset threshold and the aerial vehicle is descending.

In some embodiments, detecting the operating state of the aerial vehicle can comprise: instructing an inertial measurement unit (IMU) to measure movement information of the aerial vehicle, and obtaining the measured movement information; determining whether the aerial vehicle is landed based on the obtained movement information of the aerial vehicle; and determining that the aerial vehicle is in the landed state if the aerial vehicle is landed.

In some embodiments, shutting down a propulsion output of the aerial vehicle if the operating state of the aerial vehicle is a landed state can comprise: determining whether the propulsion output of the aerial vehicle is enabled and whether an automatic take-off operation indicated by an automatic take-off instruction is performed, if the aerial vehicle is in the landed state; and shutting down the propulsion output of the aerial vehicle if the propulsion output is enabled and the automatic take-off operation is not performed.

In some embodiments, an operating state of the aerial vehicle can be detected at least twice, and shutting down a propulsion output of the aerial vehicle if the operating state of the aerial vehicle is a landed state can comprise: detecting a position of a throttle joystick of a remote controller of the aerial vehicle if a number of detecting that the aerial vehicle being landed is greater than a preset threshold; and shutting down the propulsion output of the aerial vehicle if the throttle joystick of the remote controller is at a lowest position where the aerial vehicle is requested to land.

In some embodiments, shutting down a propulsion output of the aerial vehicle can comprise sending a power off instruction to a propulsion component of the aerial vehicle, such that the propulsion component shuts down the propulsion output in response to the power off instruction.

In some embodiments, shutting down a propulsion output of the aerial vehicle can comprise: sending a turning off instruction to a power supply of the aerial vehicle, such that the power supply shut down a powering to a propulsion component of the aerial vehicle to effect a power off operation of the propulsion output in response to the turning off instruction.

The present disclosure further provides a device for automatically shutting down an aerial vehicle. The device can comprise: a detecting module configured for detecting an operating state of the aerial vehicle; and a power off module for shutting down a propulsion output of the aerial vehicle if the operating state of the aerial vehicle is a landed state, to effect automatic powering off of the aerial vehicle after landing.

In some embodiments, the detecting module can obtain flight information of the aerial vehicle, and determine whether the flight information satisfies a preset landed criterion, and determine the aerial vehicle is in the landed state if the flight information satisfies a preset landed criterion. The flight information can comprise any one or more pieces of relative altitude information, absolute altitude information and movement information.

In some embodiments, the detecting module can comprise: a first obtaining unit for obtaining relative altitude information of the aerial vehicle, wherein the relative altitude information comprises a landing distance to a landing plane; and a first determining unit for determining the aerial vehicle is in the landed state if the obtained relative altitude information satisfies a preset landed criterion. In some instances, first determining unit can determine that the relative altitude information satisfies a preset landed criterion if a number of landing distances, which are obtained within a time period threshold and smaller than a distance threshold, reaches a threshold. The time period threshold and the distance threshold can be specified in the preset landed criterion.

In some embodiments, the detecting module can comprise: a second obtaining unit configured for obtaining absolute altitude information of the aerial vehicle; and a second determining unit for calculating a variance of absolute altitudes from the obtained absolute altitude information, and determining that the preset landed criterion is satisfied and the aerial vehicle is in the landed state if the variance is smaller than a variance threshold and the aerial vehicle is descending. The variance threshold can be specified in the preset landed criterion.

In some embodiments, the detecting module can comprise: a detecting unit for detecting an operating state of a distance measuring module which is provided in the aerial vehicle; a third determining unit for instructing the distance measuring module to detect a landing distance of the aerial vehicle to a landing plane if the operating state of the distance measuring module is a normal state, and determining that a preset landed criterion is satisfied and the aerial vehicle is in the landed state if a number of landing distances, which are detected within a preset time period threshold and are smaller than a preset distance threshold, reaches a preset threshold; and a fourth determining unit for obtaining absolute altitude information of the aerial vehicle, and calculating a variance of absolute altitudes from the obtained absolute altitude information if the operating state of the distance measuring module is an abnormal state, and determining that a preset landed criterion is satisfied and the aerial vehicle is in the landed state if the variance is smaller than a preset threshold and the aerial vehicle is descending.

In some embodiments, the detecting module can comprise: a third obtaining unit for instructing an inertial measurement unit (IMU) to measure movement information of the aerial vehicle, and obtaining the measured movement information; and a fifth determining unit for determining whether the aerial vehicle is landed based on the obtained movement information of the aerial vehicle, and determining that the aerial vehicle is in the landed state if the aerial vehicle is landed.

In some embodiments, the power off module can comprise: a determining unit for determining whether the propulsion output of the aerial vehicle is enabled and whether an automatic take-off operation indicated by an automatic take-off instruction is performed, if the aerial vehicle is in the landed state; and a first power off unit for shutting down the propulsion output of the aerial vehicle if the propulsion output is enabled and the automatic take-off operation is not performed.

In some embodiments, optionally, the power off module can comprise: a detecting unit for detecting a position of a throttle joystick of a remote controller of the aerial vehicle if a number of detecting that the aerial vehicle being landed is greater than a preset threshold; and a second power off unit for shutting down the propulsion output of the aerial vehicle if the throttle joystick of the remote controller is at a lowest position where the aerial vehicle is requested to land.

In some embodiments, in shutting down a propulsion output of the aerial vehicle, the power off module can send a power off instruction to a propulsion component of the aerial vehicle, such that the propulsion component shuts down the propulsion output in response to the power off instruction.

In some embodiments, in shutting down a propulsion output of the aerial vehicle, the power off module can send a turning off instruction to a power supply of the aerial vehicle, such that the power supply shut down a powering to a propulsion component of the aerial vehicle to effect a power off operation of the propulsion output in response to the turning off instruction.

The present disclosure further provides an aerial vehicle. The aerial vehicle can comprise a propulsion component and a flight controller. The flight controller can detect an operating state of the aerial vehicle, and shut down a propulsion output of the aerial vehicle if the operating state of the aerial vehicle is a landed state, to effect automatic powering off of the aerial vehicle after landing.

In some embodiments, the aerial vehicle can further comprise a flight sensor for obtaining flight information of the aerial vehicle, wherein the flight information comprises any one or more pieces of relative altitude information, absolute altitude information and movement information. The flight controller can determine whether the flight information satisfies a preset landed criterion, and determine that the aerial vehicle is in the landed state if the flight information satisfies the preset landed criterion.

In some embodiments, the flight sensor can comprises a distance measuring sensor for obtaining relative altitude information of the aerial vehicle. The relative altitude information can comprise a landing distance to a landing plane, and the flight controller can determine the aerial vehicle is in the landed state if the obtained relative altitude information satisfies a preset landed criterion. The flight controller can determine that the relative altitude information satisfies a preset landed criterion if a number of landing distances, which are obtained within a time period threshold and smaller than a distance threshold, reaches a threshold. The time period threshold and the distance threshold can be specified in the preset landed criterion.

In some embodiments, the flight sensor can comprise an altitude sensor for obtaining absolute altitude information of the aerial vehicle. The flight controller can calculate a variance of absolute altitudes from the obtained absolute altitude information, and determine that the preset landed criterion is satisfied and the aerial vehicle is in the landed state if the variance is smaller than a variance threshold and the aerial vehicle is descending. The variance threshold can be specified in the preset landed criterion.

In some embodiments, optionally, the flight sensor can comprise a distance measuring sensor and an altitude sensor. The distance measuring sensor can detect and record a landing distance of the aerial vehicle to a landing plane at a time interval, and the altitude can obtain the absolute altitude information of the aerial vehicle. The flight controller can (1) detect an operating state of a distance measuring module which is provided in the aerial vehicle, (2) instruct the distance measuring module to detect a landing distance of the aerial vehicle to a landing plane if the operating state of the distance measuring module is a normal state, and determine that a preset landed criterion is satisfied and the aerial vehicle is in the landed state if a number of landing distances, which are detected within a preset time period threshold and are smaller than a preset distance threshold, reaches a preset threshold, and (3) obtain absolute altitude information of the aerial vehicle, and calculate a variance of absolute altitudes from the obtained absolute altitude information if the operating state of the distance measuring module is an abnormal state, and determine that a preset landed criterion is satisfied and the aerial vehicle is in the landed state if the variance is smaller than a preset threshold and the aerial vehicle is descending.

In some embodiments, the aerial vehicle can further comprise an inertial measurement sensor for measuring movement information of the aerial vehicle. The flight controller can instruct the inertial measurement unit to measure movement information of the aerial vehicle, determine whether the aerial vehicle is landed based on the obtained movement information of the aerial vehicle, and determine that the aerial vehicle is in the landed state if the aerial vehicle is landed.

In some embodiments, the flight controller can determine whether the propulsion output of the aerial vehicle is enabled and whether an automatic take-off operation indicated by an automatic take-off instruction is performed if the aerial vehicle is in the landed state, and shut down the propulsion output of the aerial vehicle if the propulsion output is enabled and the automatic take-off operation is not performed.

In some embodiments, the flight controller can detect a position of a throttle joystick of a remote controller of the aerial vehicle if a number of detecting that the aerial vehicle being landed is greater than a preset threshold, and shut down the propulsion output of the aerial vehicle if the throttle joystick of the remote controller is at a lowest position where the aerial vehicle is requested to land.

In some embodiments, the flight controller can send a power off instruction to a propulsion component of the aerial vehicle, and the propulsion component can shut down the propulsion output in response to the power off instruction.

In some embodiments, the aerial vehicle can further comprise a power supply. The flight controller can send a turning off instruction to the power supply, and the power supply can shut down a powering to a propulsion component of the aerial vehicle.

With the present disclosure, a landing of the aerial vehicle can be accurately detected. A propulsion output of the aerial vehicle can be automatically shut down if a landing of the aerial vehicle is detected. An energy of the aerial vehicle can be saved, and a user requirement on an automatic and intelligent power off of a propulsion of aerial vehicle can be satisfied.

DETAILED DESCRIPTION OF THE DISCLOSURE

Technical solutions of the present disclosure will be described with reference to the drawings. It will be appreciated that embodiments as described in the disclosure are simple a part rather than all of the embodiments of the present disclosure. Other embodiments, which are conceived by those having ordinary skills in the art on the basis of the disclosed embodiments without inventive efforts, should fall within the protection scope of the present disclosure.

With the present disclosure, a determination can be made on whether an aerial vehicle has landed, and a propulsion output of the aerial vehicle can be disabled if it is determined that the aerial vehicle has landed. In some embodiments, the aerial vehicle can be shut shown by stopping a rotation of an electric motor of the aerial vehicle or terminating powering the electric motor of the aerial vehicle. In some embodiments, a determination can be made on whether an aerial vehicle has landed based on data of an altitude sensor (e.g., a barometer), a distance measuring sensor (e.g., an ultrasonic wave distance measuring sensor), a visual distance measuring sensor, and others flight sensors which are disposed onboard the aerial vehicle. A landing state of the aerial vehicle can be determined accurately, preventing any erroneous operations and ensuring a safety of the aerial vehicle.

Figure 1:
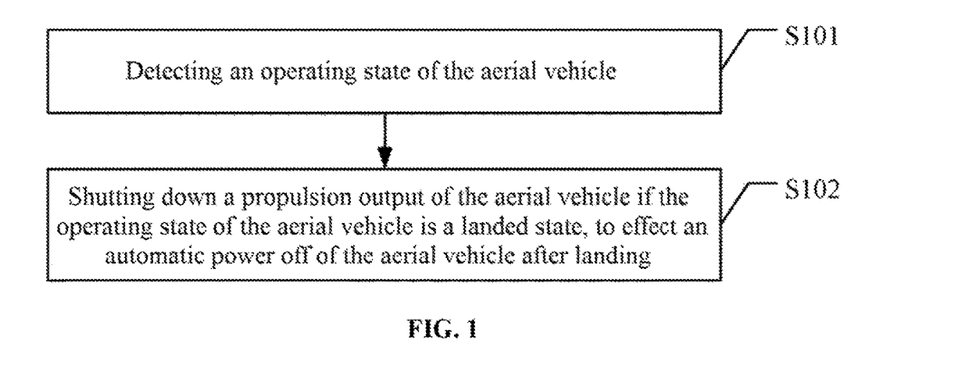
FIG. 1 is a flow chart of a method for automatically powering off an aerial vehicle according to an embodiment of the present disclosure.

FIG. 1 is a flow chart of a method for automatically powering off an aerial vehicle according to an embodiment of the present disclosure. The method can be implemented by a flight controller which is disposed onboard the aerial vehicle and connected with various sensors onboard the aerial vehicle. In some embodiments, the method can comprise processes S101 to S102.

In process S101, an operating state of an aerial vehicle can be detected.

In some instances, the operating state of the aerial vehicle can comprise a landed state, a normal flight state, a taking-off state and the like.

A landed state of the aerial vehicle can be detected by obtaining and analyzing data of various sensors.

In process S101, a determination can be made on whether the aerial vehicle has landed based on any one or more pieces of obtained flight information. The flight information can comprise relative altitude information, absolute altitude information and movement information.

In some instances, data of a distance measuring sensor can be obtained and analyzed. The distance measuring sensor can obtain a distance of the aerial vehicle relative to a landing plane (e.g., the ground). A determination can be made that the aerial vehicle is landed if a distance to the landing plane as measured by the distance measuring sensor is smaller than a preset distance threshold for a time period reaching a time period threshold. For instance, if the distance of the aerial vehicle relative to the ground is smaller than 2 centimeters for 30 seconds, a determination can be made that the aerial vehicle is landed. The distance measuring sensor can be an ultrasonic sensor, a visual distance measuring sensor, etc.

Various processes can be possible for determining a state of the aerial vehicle. In some embodiments, the process S101 can comprise determining whether a descending instruction is continuously received, determining whether a propulsion output is decreased to an output threshold which is not sufficient to support a flight of the aerial vehicle, and determining whether the aerial vehicle makes any movement based on an inertial measurement unit (IMU). If the descending instruction is continuously received, the propulsion output is smaller than the output threshold and the aerial vehicle makes no movement, a determination can be made that the aerial vehicle is landed.

In some embodiments, the process S101 can comprise calculating in real time a variance Var_press of altitude values of the aerial vehicle which are measured by a barometric altimeter. A determination can be made that the aerial vehicle is landed if Var_press is smaller than a landing threshold Var_static and the aerial vehicle is descending; otherwise, a determination can be made that the aerial vehicle is not landed.

In some embodiments, the process S101 can comprise calculating in real time a variance Var_press of altitude values of the aerial vehicle which are measured by the barometric altimeter, and counting a number of times N_us that measurements of the ultrasonic sensor being continuously smaller than a landing altitude threshold. If the ultrasonic sensor operates properly, the ultrasonic sensor can be used to determine a landing of the aerial vehicle. A determination can be made that the aerial vehicle is landed if N_us is greater than a threshold N_landing (which is a threshold for determining a landing of the aerial vehicle by means of ultrasonic sensor); otherwise, a determination can be made that the aerial vehicle is not landed. If the ultrasonic sensor operates improperly (e.g., being damaged or not accessible to the system), a barometer can be used to determine a landing of the aerial vehicle. A determination can be made that the aerial vehicle is landed if Var_press is smaller than the landing threshold Var_static and the aerial vehicle is descending; otherwise, a determination can be made that the aerial vehicle is not landed.

In process S102, a powering off signal can be sent to shut down a propulsion output to the aerial vehicle if a determination is made that the aerial vehicle is landed.

In some instances, the process S102 can comprise sending a power off instruction to a propulsion component of the aerial vehicle if a determination is made that the aerial vehicle is landed in process S101, such that the propulsion component shuts down a propulsion output in response to the power off instruction.

The process S102 can comprise sending a turn off instruction to an electric power of the aerial vehicle if a determination is made that the aerial vehicle is landed in process S101. A electric powering to the propulsion component of the aerial vehicle can be shut down in response to the power off instruction, such that the propulsion output to the aerial vehicle is shut down.

With the present disclosure, a landing of the aerial vehicle can be accurately detected. A propulsion output of the aerial vehicle can be automatically shut down if a landing of the aerial vehicle is detected. An energy of the aerial vehicle can be saved, and a user requirement on an automatic and intelligent power off of a propulsion of aerial vehicle can be satisfied.

A method for automatically powering off an aerial vehicle will be described in details according to embodiments of the present disclosure. Four methods for detecting a landing of the aerial vehicle are provided in embodiments as described with reference to FIG. 2 to FIG. 5. In implementing the present disclosure, the method of detecting a landing of the aerial vehicle can be any one or a combination of any of the four embodiments. For instance, the method of detecting a lancing of the aerial vehicle can be any one or a combination of any of the four embodiments in view of a user demand on a detecting accuracy.

Figure 2:
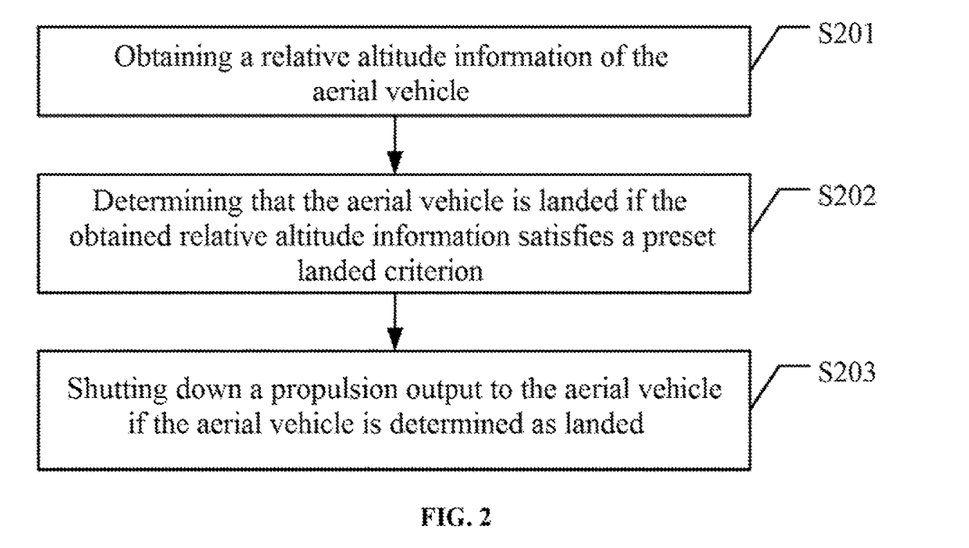
FIG. 2 is a flow chart of another method for automatically powering off an aerial vehicle according to an embodiment of the present disclosure.

FIG. 2 is a flow chart of another method for automatically powering off an aerial vehicle according to an embodiment of the present disclosure. The method can be implemented by a flight controller which is disposed onboard the aerial vehicle and connected with various sensors onboard the aerial vehicle. In some embodiments, the method can comprise processes S201 to S203.

In process S201, relative altitude information of the aerial vehicle can be obtained. The relative altitude information can comprise a landing distance to a landing plane.

In process S202, a determination is made that the aerial vehicle is landed if the obtained relative altitude information satisfies a preset landed criterion.

In some instances, relative altitude information satisfying the preset landed criterion can mean that, a number of landing distances, which are obtained within a time period threshold and smaller than a distance threshold, reaches a threshold. The time period threshold and the distance threshold are specified in the landed criterion.

The relative altitude information can be a plurality of landing distance values which are obtained in real time. Optionally, the relative altitude information can be a plurality of landing distance values which are periodically obtained at a preset time interval. A starting time of the time period threshold can be determined dynamically according to actual circumstances. For instance, a starting time of the time period threshold can be refreshed and restarted if two landing distances, which are detected consecutively, are greater than the distance threshold. For example, in 50 landing distances detected within 10 seconds, there are 48 landing distances that are smaller than the distance threshold (e.g., a threshold of 45 is exceeded), a determination can be made that the aerial vehicle satisfies the preset landed criterion, and the aerial vehicle is landed.

The relative altitude information can be a distance of an aerial vehicle relative to a below plane (e.g., the ground, a landing platform, etc.). The relative altitude information can be obtained from modules such as an ultrasonic sensor, a visual distance measuring sensor having two or more visual sensors.

In process S203, a propulsion output to the aerial vehicle can be shut down if the aerial vehicle is determined as landed, such that the aerial vehicle is automatically powered off after landing.

In some embodiments, the process S203 can comprise determining whether the propulsion output of the aerial vehicle is currently enabled and whether an automatic take-off operation indicated by an automatic take-off instruction is currently performed, if a determination is made that the aerial vehicle is landed, and shutting down the propulsion output of the aerial vehicle if the propulsion output is currently enabled and the automatic take-off operation is currently not performed. In some instances, there is a possibility that the aerial vehicle is about to take off even if the aerial vehicle is landed or the landing distance of the aerial vehicle is small for a period of time. Therefore, in some embodiments of the disclosure, a further detection on whether the aerial vehicle is to perform an automatic take-off operation can be necessary even if a determination is made that the aerial vehicle is landed. For instance, a determination can be made on whether a user enables a function of "automatic take-off after 20 seconds". If such a function is enabled, a shutting down of the propulsion output cannot be performed, and if such a function is not enabled, the propulsion output of the aerial vehicle can be shut down. In this way, other functions of the aerial vehicle (such as an automatic take-off function) may not be interrupted by shutting down the propulsion output, and any erroneous operations can be avoided.

In some embodiments, an operating state of the aerial vehicle can be detected at least twice. For instances, the process S203 can comprise detecting a position of a throttle joystick of a remote controller of the aerial vehicle if a number of detecting that the aerial vehicle being landed is greater than a preset threshold, and shutting down the propulsion output of the aerial vehicle if the throttle joystick of the remote controller is at a lowest position where the aerial vehicle is requested to land. The purpose of detecting multiple times the aerial vehicle is landed and receiving position information of a throttle joystick from a controller is to ensure the aerial vehicle is landed, and to prevent any erroneous operations.

In some embodiments, shutting down the propulsion output of the aerial vehicle can comprise sending a power off instruction to the propulsion component of the aerial vehicle, such that the propulsion component shuts down the propulsion output in response to the power off instruction, and/or sending a turning off instruction to an electric power of the aerial vehicle, such that an electric powering to the propulsion component of the aerial vehicle is shut down in response to the turning off instruction.

With the present disclosure, a landing determination can be made on whether the relative altitude information (such as a distance of the aerial vehicle relative to the ground) satisfies a preset landed criterion. The criterion can include a time period threshold, a distance threshold and a number of time threshold. A determination on whether the aerial vehicle is landed can be made effectively and accurately, preventing any erroneous determination and any erroneous operations. The propulsion output of the aerial vehicle can be instantly shut down to save energy of the aerial vehicle. A user requirement on an automatic and intelligent power off of a propulsion of aerial vehicle can be satisfied.

Figure 3:
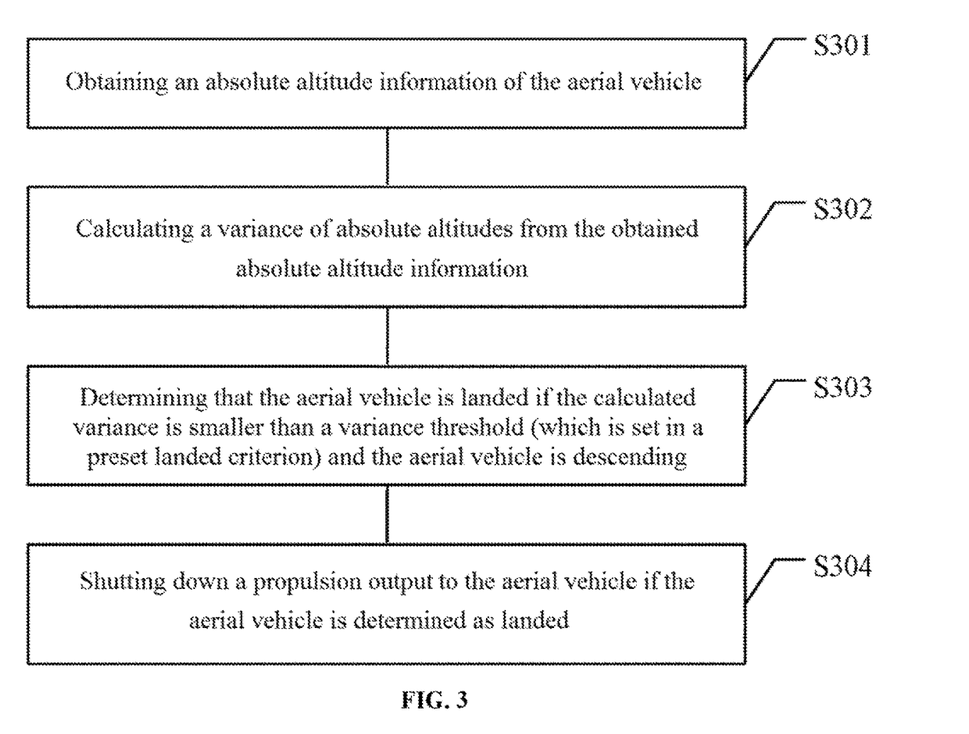
FIG. 3 is a flow chart of yet another method for automatically powering off an aerial vehicle according to an embodiment of the present disclosure.

FIG. 3 is a flow chart of yet another method for automatically powering off an aerial vehicle according to an embodiment of the present disclosure. The method can be implemented by a flight controller which is disposed onboard the aerial vehicle and connected with various sensors onboard the aerial vehicle. In some embodiments, the method can comprise processes S301 to S304.

In process S301, absolute altitude information of the aerial vehicle can be obtained during a flight.

In process S302, a variance of absolute altitudes can be calculated from the obtained absolute altitude information.

In process S303, a determination is made that the aerial vehicle is landed if the calculated variance is smaller than a variance threshold, which is set in a preset landed criterion, and the aerial vehicle is descending.

The absolute altitude information of the aerial vehicle can be measured by a sensor module. The sensor module can be a barometer and the like. A determination can be made that the aerial vehicle is landed if (1) the aerial vehicle is in a descending process (in particular, in an automatic descending process), and (2) the variance of absolute altitudes is smaller than a certain value (that is, a change in a height of the aerial vehicle is small). If the aerial vehicle is not in a descending process, the aerial vehicle may be in a flight where the absolute altitude is stable; therefore the aerial vehicle cannot be powered off.

In process S304, a propulsion output to the aerial vehicle can be shut down if the aerial vehicle is determined as landed, such that the aerial vehicle is automatically powered off after landing.

In some instances, the process S304 can comprise determining whether the propulsion output of the aerial vehicle is currently enabled and whether an automatic take-off operation indicated by an automatic take-off instruction is currently performed, if a determination is made that the aerial vehicle is landed, and shutting down the propulsion output of the aerial vehicle if the propulsion output is currently enabled and the automatic take-off operation is currently not performed. In some instances, there is a possibility that the aerial vehicle is about to take off even if the aerial vehicle is landed. Therefore, in some embodiments of the disclosure, a further detection on whether the aerial vehicle is to perform an automatic take-off operation can be necessary even if a determination is made that the aerial vehicle is landed. For instance, a determination can be made on whether a user enables a function of "automatic take-off after 20 seconds". If such a function is enabled, a shutting down of the propulsion output cannot be performed, and if such a function is not enabled, the propulsion output of the aerial vehicle can be shut down. In this way, other functions of the aerial vehicle (such as an automatic take-off function) may not be interrupted by shutting down the propulsion output, and any erroneous operations can be avoided.

In some embodiments, an operating state of the aerial vehicle can be detected at least twice. For instances, the process S304 can comprise detecting a position of a throttle joystick of a remote controller if a number of detecting that the aerial vehicle being landed is greater than a preset threshold, and shutting down the propulsion output of the aerial vehicle if the throttle joystick of the remote controller is at a lowest position (at which the aerial vehicle is requested to land). The purpose of detecting multiple times the aerial vehicle is landed and receiving position information of a throttle joystick from a controller is to ensure the aerial vehicle is landed, and to prevent any erroneous operations.

In some embodiments, shutting down the propulsion output of the aerial vehicle can comprise sending a power off instruction to the propulsion component of the aerial vehicle, such that the propulsion component shuts down the propulsion output in response to the power off instruction, and/or sending a power off instruction to an electric power of the aerial vehicle, such that an electric powering to the propulsion component of the aerial vehicle is shut down in response to the power off instruction.

With the present disclosure, a landing determination can be made based on a variance of absolute altitudes and a flight being a descending or not. A determination on whether the aerial vehicle is landed can be made effectively and accurately, preventing any erroneous determination and any erroneous operations. The propulsion output of the aerial vehicle can be instantly shut down to save energy of the aerial vehicle. A user requirement on an automatic and intelligent power off of a propulsion of aerial vehicle can be satisfied.

Figure 4:
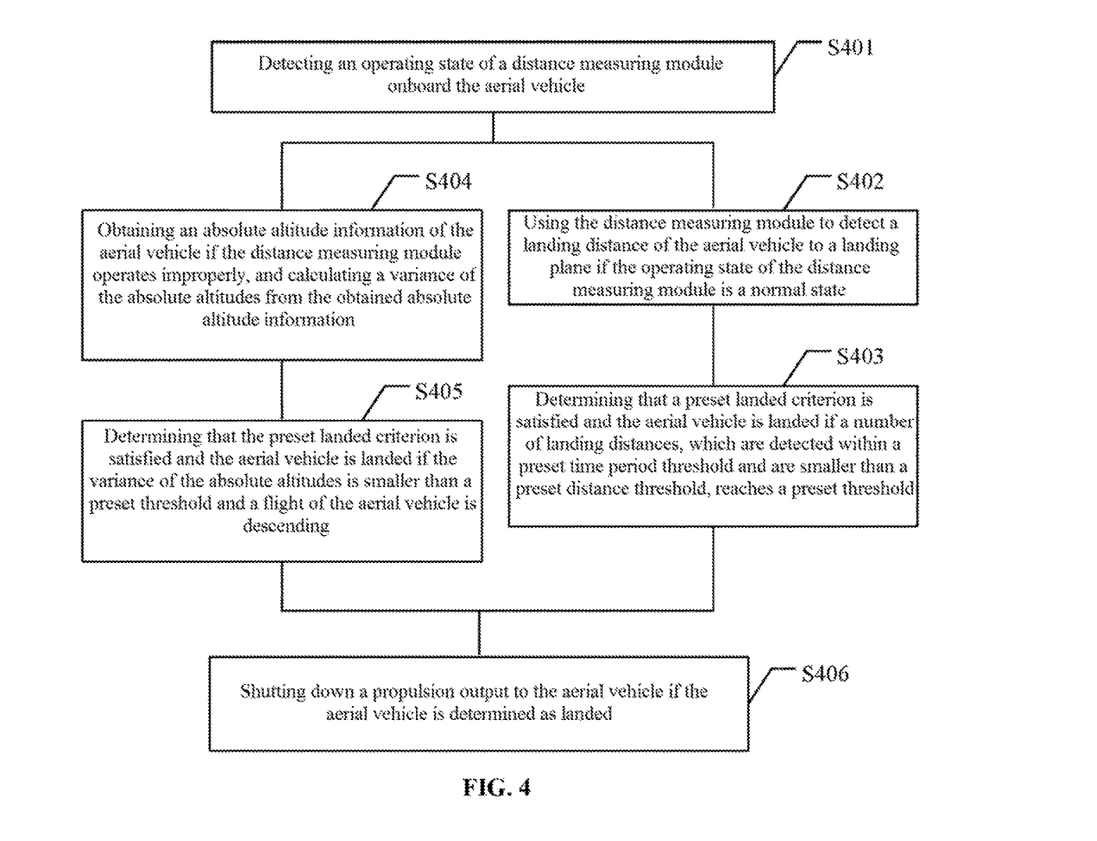
FIG. 4 is a flow chart of still yet another method for automatically powering off an aerial vehicle according to an embodiment of the present disclosure.

FIG. 4 is a flow chart of still yet another method for automatically powering off an aerial vehicle according to an embodiment of the present disclosure. The method can be implemented by a flight controller which is disposed onboard the aerial vehicle and connected with various sensors onboard the aerial vehicle. The method can comprise processes S401 to S406.

In process S401, an operating state of a distance measuring module, which is provided onboard the aerial vehicle, can be detected. The distance measuring module can be an ultrasonic sensor, a visual distance measuring sensor having two or more visual sensors, and the like.

In process S402, the distance measuring module can be used to detect a landing distance of the aerial vehicle to a landing plane if the operating state of the distance measuring module is a normal state. The detected landing distances can be a plurality of landing distance values which are detected in real time. Optionally, the detected landing distances can be a plurality of landing distance values which are detected at a certain time interval.

In process S403, a determination can be made that a preset landed criterion is satisfied and the aerial vehicle is landed if a number of landing distances, which are detected within a preset time period threshold and are smaller than a preset distance threshold, reaches a preset threshold.

The method of determining a landing of the aerial vehicle based on the landing distances and relative flight altitudes is described in embodiments with reference to FIG. 2.

In process S404, absolute altitude information of the aerial vehicle can be obtained during current flight if the distance measuring module operates improperly, and a variance of the absolute altitudes can be calculated from the obtained absolute altitude information. The absolute altitude information can be obtained by an apparatus such as a barometer.

In process S405, a determination can be made that the preset landed criterion is satisfied and the aerial vehicle is landed if the variance of the absolute altitudes is smaller than a preset threshold and a flight of the aerial vehicle is descending.

The method of determining whether the aerial vehicle is landed based on the variance of the absolute altitude information is described in embodiments with reference to FIG. 3.

In process S406, a propulsion output to the aerial vehicle can be shut down if the aerial vehicle is determined as landed, such that the aerial vehicle is automatically powered off after landing.

In some instances, the process S406 can comprise determining whether the propulsion output of the aerial vehicle is currently enabled and whether an automatic take-off operation indicated by an automatic take-off instruction is currently performed, if a determination is made that the aerial vehicle is landed, and shutting down the propulsion output of the aerial vehicle if the propulsion output is currently enabled and the automatic take-off operation is currently not performed. In some instances, there is a possibility that the aerial vehicle is about to take off even if the aerial vehicle is landed. Therefore, in some embodiments of the disclosure, a further detection on whether the aerial vehicle is to perform an automatic take-off operation can be necessary even if a determination is made that the aerial vehicle is landed. For instance, a determination can be made on whether a user enables a function of "automatic take-off after 20 seconds". If such a function is enabled, a shutting down of the propulsion output cannot be performed, and if such a function is not enabled, the propulsion output of the aerial vehicle can be shut down. In this way, other functions of the aerial vehicle (such as an automatic take-off function) may not be interrupted by shutting down the propulsion output, and any erroneous operations can be avoided.

In some embodiments, an operating state of the aerial vehicle can be detected at least twice. For instances, the process S406 can comprise detecting a position of a throttle joystick of a remote controller if a number of detecting that the aerial vehicle being landed is greater than a preset threshold, and shutting down the propulsion output of the aerial vehicle if the throttle joystick of the remote controller is at a lowest position (at which the aerial vehicle is requested to land). The purpose of detecting multiple times the aerial vehicle is landed and receiving position information of a throttle joystick from a controller is to ensure the aerial vehicle is landed, and to prevent any erroneous operations.

In some embodiments, shutting down the propulsion output of the aerial vehicle can comprise sending a power off instruction to the propulsion component of the aerial vehicle, such that the propulsion component shuts down the propulsion output in response to the power off instruction, and/or sending a power off instruction to an electric power of the aerial vehicle, such that an electric powering to the propulsion component of the aerial vehicle is shut down in response to the power off instruction.

With the present disclosure, a landing determination can be made based on a relative altitude of a flight and an absolute altitude of a flight. A determination on whether the aerial vehicle is landed can be made effectively and accurately, preventing any erroneous determination and any erroneous operations. The propulsion output of the aerial vehicle can be instantly shut down to save energy of the aerial vehicle. A user requirement on an automatic and intelligent power off of a propulsion of aerial vehicle can be satisfied.

Figure 5:
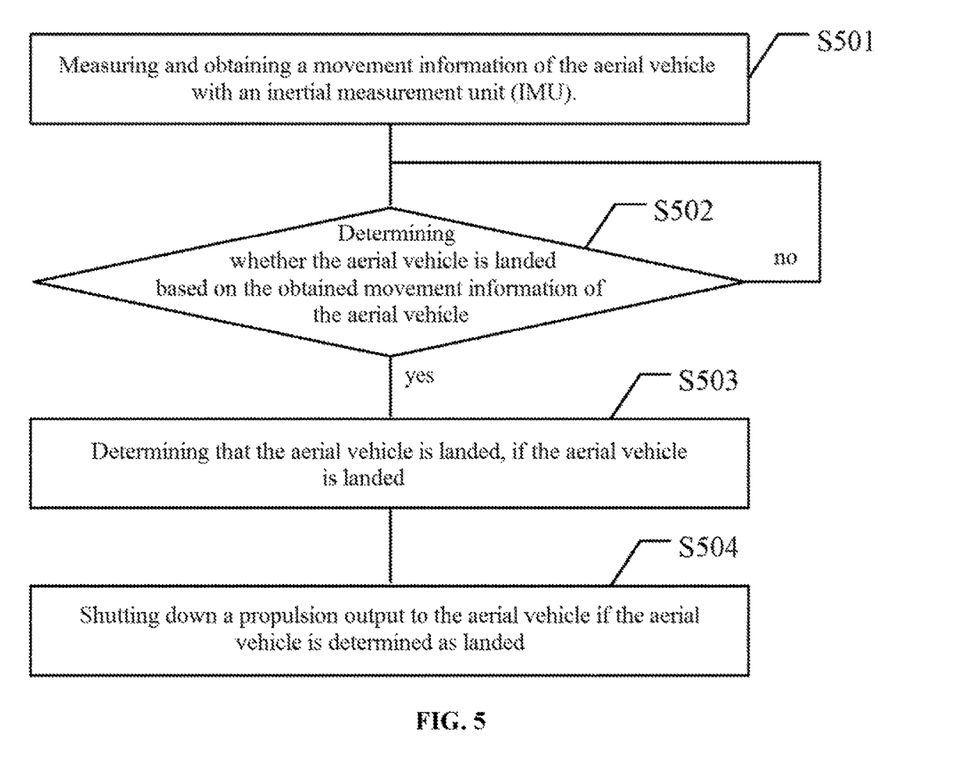
FIG. 5 is a flow chart of a method for determining an operating state of an aerial vehicle based on IMU according to an embodiment of the present disclosure.

FIG. 5 is a flow chart of a method for determining an operating state of an aerial vehicle based on IMU according to an embodiment of the present disclosure. The method can be implemented by a flight controller which is disposed onboard the aerial vehicle and connected with IMU onboard the aerial vehicle. The method can comprise processes S501 to S504.

In process S501, movement information of the aerial vehicle can be measured and obtained with an inertial measurement unit (IMU).

In process S502, a determination can be made on whether the aerial vehicle is landed based on the obtained movement information of the aerial vehicle.

In process S503, a determination can be made that the aerial vehicle is landed, if the aerial vehicle is landed.

In some embodiments of the present disclosure, a movement of the aerial vehicle can be detected by a IMU. In particularly, in performing an automatic descending operation, a determination can be made that the aerial vehicle is landed if no movement of the aerial vehicle is detected by the IMU sensor. The movement information can comprise a three-dimensional acceleration, a three-dimensional angular acceleration, etc. A determination can be made that no movement of the aerial vehicle occurs and the aerial vehicle is landed if a value of the three-dimensional acceleration and/or the three-dimensional angular acceleration is small or a variation thereof is smaller than a preset threshold.

In process S504, a propulsion output to the aerial vehicle can be shut down if the aerial vehicle is determined as landed, such that the aerial vehicle is automatically powered off after landing.

In some instances, the process S504 can comprise determining whether the propulsion output of the aerial vehicle is currently enabled and whether an automatic take-off operation indicated by an automatic take-off instruction is currently performed, if a determination is made that the aerial vehicle is landed, and shutting down the propulsion output of the aerial vehicle if the propulsion output is currently enabled and the automatic take-off operation is currently not performed. In some instances, there is a possibility that the aerial vehicle is about to take off even if the aerial vehicle is landed. Therefore, in some embodiments of the disclosure, a further detection on whether the aerial vehicle is to perform an automatic take-off operation can be necessary even if a determination is made that the aerial vehicle is landed. For instance, a determination can be made on whether a user enables a function of "automatic take-off after 20 seconds". If such a function is enabled, a shutting down of the propulsion output cannot be performed, and if such a function is not enabled, the propulsion output of the aerial vehicle can be shut down. In this way, other functions of the aerial vehicle (such as an automatic take-off function) may not be interrupted by shutting down the propulsion output, and any erroneous operations can be avoided.

In some embodiments, an operating state of the aerial vehicle can be detected at least twice. For instances, the process S504 can comprise detecting a position of a throttle joystick of a remote controller if a number of detecting that the aerial vehicle being landed is greater than a preset threshold, and shutting down the propulsion output of the aerial vehicle if the throttle joystick of the remote controller is at a lowest position (at which the aerial vehicle is requested to land). The purpose of detecting multiple times the aerial vehicle is landed and receiving position information of a throttle joystick from a controller is to ensure the aerial vehicle is landed, and to prevent any erroneous operations.

In some embodiments, shutting down the propulsion output of the aerial vehicle can comprise sending a power off instruction to the propulsion component of the aerial vehicle, such that the propulsion component shuts down the propulsion output in response to the power off instruction, and/or sending a power off instruction to an electric power of the aerial vehicle, such that an electric powering to the propulsion component of the aerial vehicle is shut down in response to the power off instruction.

With the present disclosure, a landing determination can be made based on a IMU data. A determination on whether the aerial vehicle is landed can be made effectively and accurately, preventing any erroneous determination and any erroneous operations. The propulsion output of the aerial vehicle can be instantly shut down to save energy of the aerial vehicle. A user requirement on an automatic and intelligent power off of a propulsion of aerial vehicle can be satisfied.

A device for automatically powering off an aerial vehicle and an aerial vehicle according to embodiments of the present disclosure will be described in details below.

Figure 6:
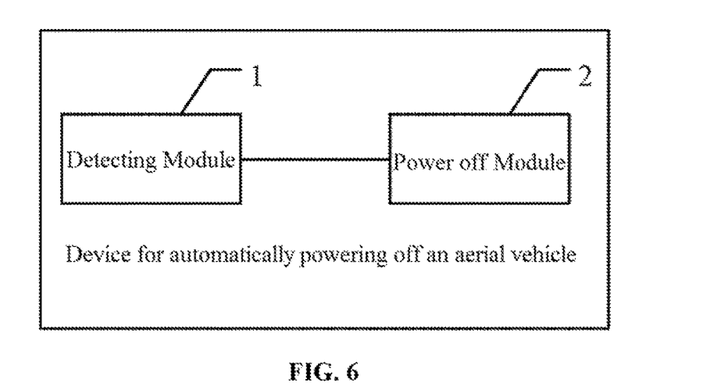
FIG. 6 is a view showing a structure of a device for automatically powering off an aerial vehicle according to an embodiment of the present disclosure.

FIG. 6 is a view showing a structure of a device for automatically powering off an aerial vehicle according to an embodiment of the present disclosure. The device can be disposed in a flight controller of the aerial vehicle. In some embodiments, the device can comprise modules 1 and 2.

The detecting module 1 can detect an operating state of the aerial vehicle.

The power off module 2 can shut down a propulsion output of the aerial vehicle to effect automatic powering off of the aerial vehicle after landing, if the operating state of the aerial vehicle is a landed state.

In some embodiments, the operating state of the aerial vehicle can comprise a landed state, a normal flight state, a taking-off state, etc.

The detecting module 1 can determine whether the aerial vehicle is in the landed state by obtaining data of various sensors.

The detecting module 1 can determine whether the aerial vehicle is landed based on a comparison of any one or more pieces of the obtained flight information, including relative altitude information, absolute altitude information and movement information, with the criterions for determining a landing.

In some embodiments, the detecting module 1 can obtain and analyze data of a distance measuring sensor. The distance measuring sensor can obtain a distance of the aerial vehicle relative to a landing plane (e.g., the ground). The detecting module 1 can determine that the aerial vehicle is in the landed state if the distance of the aerial vehicle relative to the landing plane as measured by the distance measuring sensor is smaller than a preset distance threshold for a time period reaching a time period threshold. For instance, if the distance of the aerial vehicle relative to the ground is smaller than 2 centimeters for 30 seconds, a determination can be made that the aerial vehicle is landed. The distance measuring sensor can be an ultrasonic sensor, a visual distance measuring sensor, etc.

In some embodiments, the detecting module 1 can determine whether a descending instruction is continuously received, determining whether a propulsion output is decreased to an output threshold which is not sufficient to support a flight of the aerial vehicle, and determine whether the aerial vehicle makes any movement based on an inertial measurement unit (IMU). If the descending instruction is continuously received, the propulsion output is smaller than the output threshold and the aerial vehicle makes no movement, a determination can be made that the aerial vehicle is in the landed state.

In some embodiments, the detecting module 1 can calculate in real time a variance Var_press of altitude values of the aerial vehicle which are measured by the barometric altimeter. A determination can be made that the aerial vehicle is landed if Var_press is smaller than a landing threshold Var_static and the aerial vehicle is descending; otherwise, a determination can be made that the aerial vehicle is not landed.

In some embodiments, the detecting module 1 can calculate in real time a variance Var_press of altitude values of the aerial vehicle which are measured by the barometric altimeter, and count a number of times N_us that measurements of the ultrasonic sensor being continuously smaller than a landing altitude threshold. If the ultrasonic sensor operates properly, the ultrasonic sensor can be used to determine a landing of the aerial vehicle. A determination can be made that the aerial vehicle is landed if N_us is greater than a threshold N_landing (which is a threshold for determining a landing of the aerial vehicle by means of ultrasonic sensor); otherwise, a determination can be made that the aerial vehicle is not landed. If the ultrasonic sensor operates improperly (e.g., being damaged or not accessible to the system), a barometer can be used to determine a landing of the aerial vehicle. A determination can be made that the aerial vehicle is landed if Var_press is smaller than the landing threshold Var_static and the aerial vehicle is descending; otherwise, a determination can be made that the aerial vehicle is not landed.

The power off module 2 can send a powering off signal to shut down a propulsion output to the aerial vehicle if the detecting module 1 determines that the aerial vehicle is in the landed state.

In some instances, the power off module 2 can send a power off instruction to a propulsion component of the aerial vehicle if the detecting module 1 detects that the aerial vehicle is in the landed state, such that the propulsion component shuts down a propulsion output in response to the power off instruction The power off module 2 can send a turn off instruction to a power supply of the aerial vehicle if the detecting module 1 detects that the aerial vehicle is in the landed state. A electric powering to the propulsion component of the aerial vehicle can be shut down in response to the power off instruction, such that the propulsion output to the aerial vehicle is shut down.

With the present disclosure, a landing of the aerial vehicle can be accurately detected. A propulsion output of the aerial vehicle can be automatically shut down if a landing of the aerial vehicle is detected. An energy of the aerial vehicle can be saved, and a user requirement on an automatic and intelligent power off of a propulsion of aerial vehicle can be satisfied.

In another embodiment of the device for automatically powering off an aerial vehicle, the device can comprise the detecting module 1 and the power off module 2 as described hereinabove. In the another embodiment, the detecting module 1 can obtain flight information of the aerial vehicle and determine whether the flight information satisfies a landed criterion. The detecting module 1 can determine that the aerial vehicle is in the landed state if the flight information satisfies the landed criterion. The flight information can comprise one or more pieces of relative altitude information, absolute altitude information and movement information.

Figure 7:
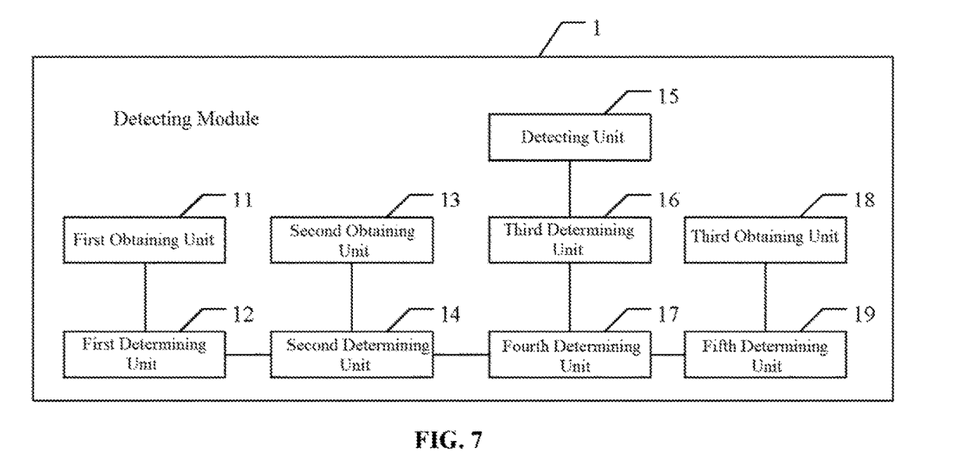
FIG. 7 is a view showing a structure of a detecting module in FIG. 6.

In some embodiments, as shown in FIG. 7, the detecting module 1 can comprise a first obtaining unit 11 and a first determining unit 12.

The first obtaining unit 11 can obtain relative altitude information of the aerial vehicle. The relative altitude information can comprise a landing distance to a landing plane.

The first determining unit 12 can determine that the aerial vehicle is in the landed state if the obtained relative altitude information of the aerial vehicle satisfies a preset landed criterion.

In some instances, the first determining unit 12 can determine that the relative altitude information satisfies the preset landed criterion if a number of landing distances, which are obtained within a time period threshold and are smaller than a distance threshold, reaches a threshold. The time period threshold and the distance threshold are specified in the landed criterion.

The relative altitude information can be relative altitude information of the aerial vehicle. The relative altitude information can be detected and obtained by an ultrasonic detector, a visual distance measuring sensor, etc. The relative altitude information can be obtained in real time. Optionally, the relative altitude information can be periodically obtained at a certain time interval.

In some embodiments, as shown in FIG. 7, the detecting module 1 can comprise a second obtaining unit 13 and a second determining unit 14:

The second obtaining unit 13 can obtain absolute altitude information of the aerial vehicle.

The second determining unit 14 can calculate a variance of absolute altitudes from the obtained absolute altitude information. The second determining unit 14 can determine that a preset landed criterion is satisfied and the aerial vehicle is in the landed state, if the obtained variance is smaller than a variance threshold, which is specified in a preset landed criterion, and the aerial vehicle is in a descending process.

The absolute altitude information can be measured by a sensor such as a barometer. The absolute altitude information of the aerial vehicle can be obtained in real time during a flight.

In some embodiments, as shown in FIG. 7, the detecting module 1 can comprise a detecting unit 15, third determining unit 16 and a fourth determining unit 17.

The detecting unit 15 can detect an operating state of a distance measuring module onboard the aerial vehicle.

The third determining unit 16 can instruct the distance measuring module to detect a landing distance of the aerial vehicle to a landing plane if the operating state of the distance measuring module is a normal state. The third determining unit 16 can determine that a preset landed criterion is satisfied and the aerial vehicle is in the landed state if a number of landing distances, which are detected within a preset time period threshold and are smaller than a preset distance threshold, reaches a preset threshold.

The fourth determining unit 17 can obtain absolute altitude information of the aerial vehicle, and calculate a variance of absolute altitudes from the obtained absolute altitude information if the operating state of the distance measuring module is an abnormal state. The fourth determining unit 17 can determine that a preset landed criterion is satisfied and the aerial vehicle is in the landed state if the obtained variance is smaller than a preset threshold and the aerial vehicle is descending.

In some embodiments, as shown in FIG. 7, the detecting module 1 can comprise a third obtaining unit 18 and a fifth determining unit 19.

The third obtaining unit 18 can instruct an inertial measurement unit (IMU) to measure movement information of the aerial vehicle, and obtain the measured movement information;

The fifth determining unit 19 can determine whether the aerial vehicle is landed based on the obtained movement information. If the aerial vehicle is landed, a determination can be made that the aerial vehicle is landed.

A movement of the aerial vehicle can be determined from an acceleration, an angular acceleration of the aerial vehicle as detected by the IMU. In some instances, after the aerial vehicle performs a descending operation such as an automatic descending, a determination is made that the aerial vehicle is landed if it is determined from the IMU that the aerial vehicle has no movement.

It will be appreciated that, the detecting module 1 can comprise any one or more pieces of a combination of the first obtaining unit 11 and the first determining unit 12, a combination of the second obtaining unit 13 and the second determining unit 14, a combination of the detecting unit 15, the third determining unit 16 and the fourth determining unit 17, and a combination of the third obtaining unit 18 and the fifth determining unit 19, so as to satisfy a user requirement on precision in detecting the landed state.

Figure 8:
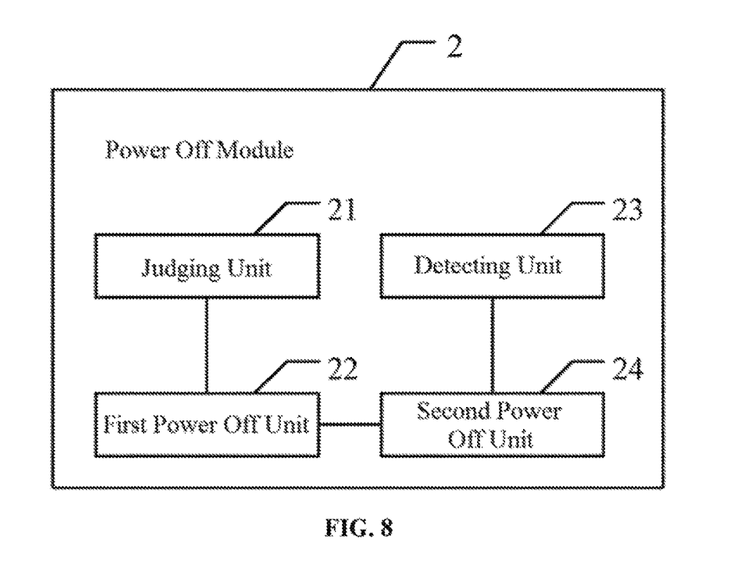
FIG. 8 is a view showing a structure of a power off module in FIG. 6.

In some embodiments, as shown in FIG. 8, the power off module 2 can comprise a determining unit 21 and a first power off unit 22.

The determining unit 21 can determine whether the propulsion output of the aerial vehicle is currently enabled and whether an automatic take-off operation indicated by an automatic take-off instruction is currently performed, if the aerial vehicle is in a landed state.

The first power off unit 22 can shut down the propulsion output of the aerial vehicle if the propulsion output is currently enabled and the automatic take-off operation is currently not performed.

In some embodiments, as shown in FIG. 8, the power off module 2 can comprise a detecting unit 23 and a second power off unit 24.

The detecting unit 23 can detect a position of a throttle joystick of a remote controller if a number of detecting that the aerial vehicle being landed is greater than a preset threshold.

The second power off unit 24 can shut down the propulsion output of the aerial vehicle if the throttle joystick of the remote controller is at a lowest position (at which the aerial vehicle is requested to land).

In some embodiments, in shutting down the propulsion output of the aerial vehicle, the power off module 2 can send a power off instruction to the propulsion component of the aerial vehicle, such that the propulsion component shuts down the propulsion output in response to the power off instruction.

In some embodiments, in shutting down the propulsion output of the aerial vehicle, the power off module 2 can send a turning off instruction to an electric power of the aerial vehicle, such that an electric powering to the propulsion component of the aerial vehicle is shut down in response to the turning off instruction.

It will be appreciated that, a description of modules or units in the device for automatically powering off an aerial vehicle according to an embodiment of the present disclosure can refer to the description of embodiments as described with reference to FIG. 1 to FIG. 5.

With the present disclosure, a landing of the aerial vehicle can be accurately detected. A propulsion output of the aerial vehicle can be automatically shut down if a landing of the aerial vehicle is detected. An energy of the aerial vehicle can be saved, and a user requirement on an automatic and intelligent power off of a propulsion of aerial vehicle can be satisfied.

Figure 9:
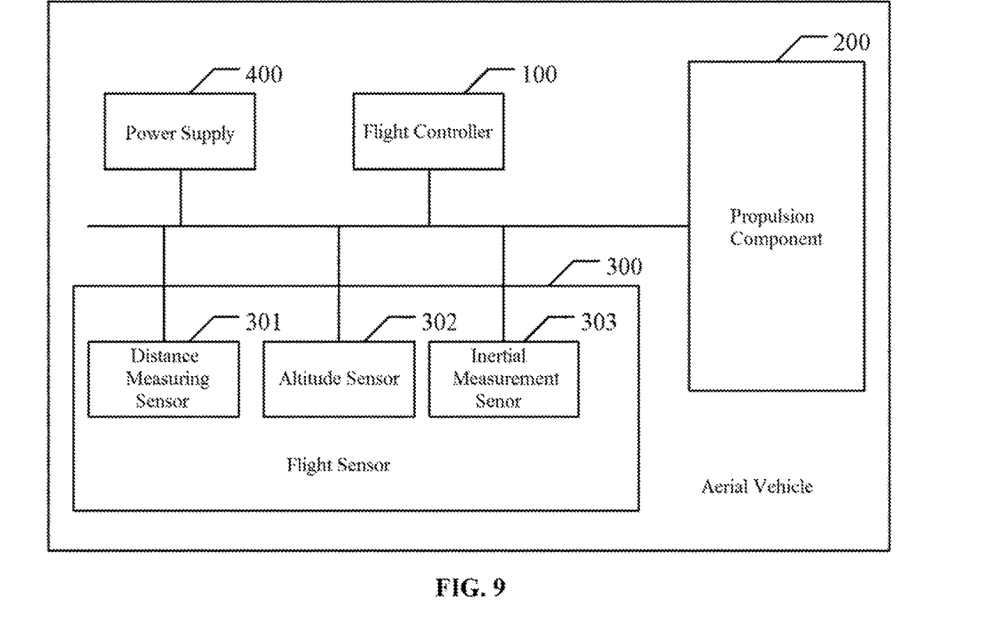
FIG. 9 is a view showing a structure of an aerial vehicle according to an embodiment of the present disclosure.

FIG. 9 is a view showing a structure of an aerial vehicle according to an embodiment of the present disclosure. The aerial vehicle of the embodiment can be various types of rotor-wing aerial vehicles. In some embodiments, the aerial vehicle can comprise a propulsion component 200 and a flight controller 100. The propulsion component 200 can provide a propulsion for the aerial vehicle and enable the aerial vehicle to perform various flight. The flight controller 100 can implement various functions under the control of applications stored in a memory.

The flight controller 100 can detect an operating state of the aerial vehicle, and shut down the propulsion output of the propulsion component 200 if the aerial vehicle is in the landed state, to effect automatic powering off of the aerial vehicle after landing.

In some embodiments, the aerial vehicle can comprise a flight sensor 300. The flight sensor 300 can obtain flight information of the aerial vehicle. The flight information can comprise any one or more pieces of relative altitude information, absolute altitude information and movement information of the aerial vehicle In some embodiments, the flight controller 100 can determine whether the obtained information from the flight sensor 300 satisfies a preset landed criterion. A determination can be made that the aerial vehicle is in a landed state if the preset landed criterion is satisfied.

In some embodiments, the flight sensor 300 can comprise a distance measuring sensor 301. The distance measuring sensor 301 can obtain relative altitude information of the aerial vehicle. The relative altitude information can comprise a landing distance to a landing plane.

The flight controller 100 is configured for determining that the aerial vehicle is in the landed state if the relative altitude information obtained from the distance measuring sensor 301 satisfies a preset landed criterion.

In some embodiments, the flight controller 100 can determine that the relative altitude information satisfies a preset landed criterion if a number of landing distances, which are obtained within a time period threshold and are smaller than a distance threshold, reaches a threshold. The time period threshold and the distance threshold are specified in the landed criterion.

In some embodiments, the flight sensor 300 can comprise an altitude sensor 302. The altitude sensor 302 can obtain absolute altitude information of the aerial vehicle.

The flight controller 100 can calculate a variance of absolute altitudes from the absolute altitude information obtained from the altitude sensor 200. The flight controller 100 can determine that a preset landed criterion is satisfied and the aerial vehicle is in the landed state if the obtained variance is smaller than a preset threshold and the aerial vehicle is descending.

The flight sensor 300 can comprise one of or a combination of the above-described distance measuring sensor 301 and altitude sensor 302. The flight controller 100 can determine whether the aerial vehicle is in the landed state based on data from the distance measuring sensor 301 or the altitude sensor 302. Alternatively, the flight sensor 300 can determine whether the aerial vehicle is in the landed state based on data from both the distance measuring sensor 301 and the altitude sensor 302. In some instance, the distance measuring sensor 301 can detect and record a landing distance of the aerial vehicle to a landing plane at a certain time interval. The altitude sensor 302 can obtain absolute altitude information of the aerial vehicle during a flight.

The flight controller 100 can detect an operating state of a distance measuring module onboard the aerial vehicle. The flight controller 100 can instruct the distance measuring module to detect a landing distance of the aerial vehicle to a landing plane if the operating state of the distance measuring module is a normal state. The flight controller 100 can determine that a preset landed criterion is satisfied and the aerial vehicle is in the landed state if a number of landing distances, which are detected within a preset time period threshold and are smaller than a preset distance threshold, reaches a preset threshold. Otherwise, the flight controller 100 can obtain absolute altitude information of the aerial vehicle, and calculate a variance of absolute altitudes from the obtained absolute altitude information if the operating state of the distance measuring module is an abnormal state. The flight controller 100 can determine that a preset landed criterion is satisfied and the aerial vehicle is in the landed state if the a variance is smaller than a preset threshold and the aerial vehicle is descending.

In some embodiments, the aerial vehicle can comprise an inertial measurement sensor 303. The inertial measurement sensor 303 can measure movement information of the aerial vehicle. The flight controller 100 can instruct the inertial measurement sensor 303 to measure the movement information of the aerial vehicle, and determine whether the aerial vehicle is landed based on the movement information obtained from the inertial measurement sensor 303. If the aerial vehicle is landed, a determination can be made that the aerial vehicle is landed.

In some embodiments, the flight controller 100 can determine whether the propulsion output of the aerial vehicle is currently enabled and whether an automatic take-off operation indicated by an automatic take-off instruction is currently performed, if the aerial vehicle is in a landed state. The flight controller 100 can shut down the propulsion output of the aerial vehicle if the propulsion output is currently enabled and the automatic take-off operation is currently not performed.

In some embodiments, the flight controller 100 can detect a position of a throttle joystick of a remote controller if a number of detecting that the aerial vehicle being landed is greater than a preset threshold. The flight controller 100 can shut down the propulsion output of the aerial vehicle if the throttle joystick of the remote controller is at a lowest position (at which the aerial vehicle is requested to land).

In some embodiments, the flight controller 100 can send a power off instruction a propulsion component 200 of the aerial vehicle. The propulsion component can shut down the propulsion output in response to the power off instruction.

In some embodiments, the aerial vehicle can comprise a power supply 400. The flight controller 100 can send a turning off instruction to the power supply 400. The power supply 400 can turn off a powering to the propulsion component 200 in response to the turning off instruction.

It will be appreciated that, a description of various components of the aerial vehicle can refer to the description of embodiments as described with reference to FIG. 1 to FIG. 7.

With the present disclosure, a landing of the aerial vehicle can be accurately detected. A propulsion output of the aerial vehicle can be automatically shut down if a landing of the aerial vehicle is detected. An energy of the aerial vehicle can be saved, and a user requirement on an automatic and intelligent power off of a propulsion of aerial vehicle can be satisfied.

It will be appreciated that, in the embodiments described hereinabove, the disclosed devices and methods can be implemented by various ways. For instance, the above-described device embodiments are merely schematic. For example, a division of the modules or units is merely a division in logic function, and other division manners of the modules or units can be otherwise implemented. In some instances, a plurality of units or components can be combined or integrated into another system. Optionally, some features can be omitted or not performed. Furthermore, a coupling, a direct coupling or a direct communication connection between modules can be an indirect coupling or an indirect communication connection via an interface. An indirect coupling or a communication connection between modules can be in electrical coupling, mechanical coupling or a coupling in other forms.

Units described as separate parts can or cannot be physically separated. Components shown as units can or cannot be physical units, for instance, they can be located in one place, or can be distributed into a plurality of network units. Some or all of the units can be selected to achieve the objects of the embodiments in view of actual requirements.

Various functional units described in various embodiments of the present disclosure can be integrated into one processing unit. Optionally, the various functional units can be physical individuals. Two or more of the various function units can be integrated into one unit. The integrated unit can be implemented in a form of hardware or in a form of software functional units.

If integrated units are implemented in a form of software functional units and sold or used as independent products, they can be stored in a computer readable storage medium. In this concept, some or all of the technical solution consistent with the present disclosure can be embodied in a form of a software product. The software product can be stored in a storage medium. The software product can comprise instructions which cause a computer processor to execute some or all of the processes of methods in various embodiments of the present disclosure. The above-mentioned storage medium can comprise various medium capable of storing program codes, such as a USB flash disk, a movable hard disc, a Read-Only Memory (ROM), a random access memory (RAM), a diskette or an optical disc.

The foregoing disclosure is merely illustrative of the embodiments of the disclosure but not intended to limit the scope of the disclosure. Any equivalent modifications to a structure or process flow, which are made without departing from the specification and the drawings of the disclosure, and a direct or indirect application in other relevant technical fields, shall also fall into the scope of the disclosure.

What is claimed is:

1. A method for automatically powering off an aerial vehicle, comprising:
   detecting an operating state of the aerial vehicle;
   determining whether the operating state of the aerial vehicle indicates that the aerial vehicle has landed; and
   in response to a determination result that the aerial vehicle has landed, shutting down a propulsion output of the aerial vehicle, to effect automatic powering off of the aerial vehicle after landing.

2. The method of claim 1, wherein detecting the operating state of the aerial vehicle comprises:
   obtaining flight information of the aerial vehicle, and determining whether the flight information satisfies a preset landed criterion, wherein the flight information comprises any one or more pieces of relative altitude information, absolute altitude information and movement information; and
   determining the aerial vehicle has landed, if the flight information satisfies a preset landed criterion.

3. The method of claim 1, wherein detecting the operating state of the aerial vehicle comprises:

obtaining relative altitude information of the aerial vehicle, wherein the relative altitude information comprises a landing distance to a landing plane; and determining the aerial vehicle has landed if the obtained relative altitude information satisfies a preset landed criterion;

wherein the relative altitude information satisfying the preset landed criterion comprises: a number of landing distances, which are obtained within a time period threshold and smaller than a distance threshold, reaches a threshold, wherein the time period threshold and the distance threshold are specified in the preset landed criterion.

4. The method of claim 1, wherein detecting the operating state of the aerial vehicle comprises:

obtaining absolute altitude information of the aerial vehicle;

calculating a variance of absolute altitudes from the obtained absolute altitude information; and determining that the preset landed criterion is satisfied and the aerial vehicle has landed, if the variance is smaller than a variance threshold and the aerial vehicle is descending, wherein the variance threshold is specified in the preset landed criterion.

5. The method of claim 1, wherein detecting the operating state of the aerial vehicle comprises:

detecting an operating state of a distance measuring sensor which is provided in the aerial vehicle;

instructing the distance measuring sensor to detect a landing distance of the aerial vehicle to a landing plane if the operating state of the distance measuring sensor is a normal state, and determining that a preset landed criterion is satisfied and the aerial vehicle has landed if a number of landing distances, which are detected within a preset time period threshold and are smaller than a preset distance threshold, reaches a preset threshold; and obtaining absolute altitude information of the aerial vehicle, and calculating a variance of absolute altitudes from the obtained absolute altitude information if the operating state of the distance measuring sensor is an abnormal state, and determining that a preset landed criterion is satisfied and the aerial vehicle has landed if the variance is smaller than a preset threshold and the aerial vehicle is descending.

6. The method of claim 1, wherein detecting the operating state of the aerial vehicle comprises:

instructing an inertial measurement unit (IMU) to measure movement information of the aerial vehicle, and obtaining the measured movement information; and determining whether the aerial vehicle is landed based on the obtained movement information of the aerial vehicle.

7. The method of claim 1, wherein shutting down the propulsion output of the aerial vehicle if the operating state of the aerial vehicle indicates that the aerial vehicle has landed comprises:

determining whether the propulsion output of the aerial vehicle is enabled and whether an automatic take-off operation indicated by an automatic take-off instruction is performed, if the aerial vehicle has landed; and shutting down the propulsion output of the aerial vehicle if the propulsion output is enabled and the automatic take-off operation is not performed.

8. The method of claim 1, wherein the operating state of the aerial vehicle is detected at least twice, and shutting down the propulsion output of the aerial vehicle if the operating state of the aerial vehicle indicates that the aerial vehicle has landed comprises:

detecting a position of a throttle joystick of a remote controller of the aerial vehicle if a number of detecting that the aerial vehicle being landed is greater than a preset threshold; and shutting down the propulsion output of the aerial vehicle if the throttle joystick of the remote controller is at a lowest position where the aerial vehicle is requested to land.

9. The method of claim 1, wherein shutting down the propulsion output of the aerial vehicle comprises:

sending a power off instruction to a propulsion component of the aerial vehicle, such that the propulsion component shuts down the propulsion output in response to the power off instruction.

10. The method of claim 1, wherein shutting down the propulsion output of the aerial vehicle comprises:

sending a turning off instruction to a power supply of the aerial vehicle, such that the power supply shut down powering to a propulsion component of the aerial vehicle to effect a power off operation of the propulsion output in response to the turning off instruction.

11. An aerial vehicle, comprising:

a propulsion component; and a flight controller configured to:

detect an operating state of the aerial vehicle, determining whether the operating state of the aerial vehicle indicates that the aerial vehicle has landed, and in response to a determination result that the aerial vehicle has landed, shut down a propulsion output of the aerial vehicle, to effect automatic powering off of the aerial vehicle after landing.

12. The aerial vehicle of claim 11, further comprising a flight sensor for obtaining flight information of the aerial vehicle, wherein the flight information comprises any one or more of relative altitude information, absolute altitude information and movement information;

wherein the flight controller is further configured to determine whether the flight information satisfies a preset landed criterion, and determine that the aerial vehicle has landed if the flight information satisfies the preset landed criterion.

13. The aerial vehicle of claim 12, wherein the flight sensor comprises a distance measuring sensor for obtaining relative altitude information of the aerial vehicle, wherein the relative altitude information comprises a landing distance to a landing plane, and the flight controller is further configured to determine the aerial vehicle has landed if the obtained relative altitude information satisfies a preset landed criterion; and wherein the flight controller is further configured to determine that the relative altitude information satisfies a preset landed criterion if a number of landing distances, which are obtained within a time period threshold and smaller than a distance threshold, reaches a threshold, wherein the time period threshold and the distance threshold are specified in the preset landed criterion.

14. The aerial vehicle of claim 12, wherein the flight sensor comprises an altitude sensor for obtaining absolute altitude information of the aerial vehicle; and wherein the flight controller is further configured to calculate a variance of absolute altitudes from the obtained absolute altitude information, and determine that the preset landed criterion is satisfied and the aerial vehicle has landed if the variance is smaller than a variance threshold and the aerial vehicle is descending, wherein the variance threshold is specified in the preset landed criterion.

15. The aerial vehicle of claim 12, wherein the flight sensor comprises a distance measuring sensor and an altitude sensor, the distance measuring sensor being configured to detect and record a landing distance of the aerial vehicle to a landing plane at a time interval, and the altitude being configured to obtain the absolute altitude information of the aerial vehicle; and wherein the flight controller is further configured to (1) detect an operating state of a distance measuring sensor which is provided in the aerial vehicle, (2) instruct the distance measuring sensor to detect a landing distance of the aerial vehicle to a landing plane if the operating state of the distance measuring sensor is a normal state, and determine that a preset landed criterion is satisfied and the aerial vehicle has landed if a number of landing distances, which are detected within a preset time period threshold and are smaller than a preset distance threshold, reaches a preset threshold, and (3) obtain absolute altitude information of the aerial vehicle, and calculate a variance of absolute altitudes from the obtained absolute altitude information if the operating state of the distance measuring sensor is an abnormal state, and determine that a preset landed criterion is satisfied and the aerial vehicle has landed if the variance is smaller than a preset threshold and the aerial vehicle is descending.

16. The aerial vehicle of claim 11, further comprising an inertial measurement sensor for measuring movement information of the aerial vehicle;

wherein the flight controller is further configured to instruct the inertial measurement unit to measure the movement information of the aerial vehicle, determine whether the aerial vehicle is landed based on the obtained movement information of the aerial vehicle.

17. The aerial vehicle of claim 11, wherein the flight controller is further configured to determine whether the propulsion output of the aerial vehicle is enabled and whether an automatic take-off operation indicated by an automatic take-off instruction is performed if the aerial vehicle has landed, and shut down the propulsion output of the aerial vehicle if the propulsion output is enabled and the automatic take-off operation is not performed.

18. The aerial vehicle of claim 11, wherein the flight controller is further configured to detect a position of a throttle joystick of a remote controller of the aerial vehicle if a number of detecting that the aerial vehicle being landed is greater than a preset threshold, and shut down the propulsion output of the aerial vehicle if the throttle joystick of the remote controller is at a lowest position where the aerial vehicle is requested to land.

19. The aerial vehicle of claim 11, wherein the flight controller is further configured to send a power off instruction to a propulsion component of the aerial vehicle, and the propulsion component is configured to shut down the propulsion output in response to the power off instruction.

20. The aerial vehicle of claim 11, further comprising a power supply, wherein the flight controller is further configured to send a turning off instruction to the power supply, and the power supply is configured to shut down powering to a propulsion component of the aerial vehicle.

* * * * *